United States Patent [19]

Palm

[11] Patent Number: 4,486,823
[45] Date of Patent: Dec. 4, 1984

[54] CIRCUIT FOR CONVERTING AN INPUT D.C. VOLTAGE INTO AN OUTPUT D.C. VOLTAGE

[75] Inventor: Erich J. Palm, Eindhoven, Netherlands

[73] Assignee: U.S. Philips Corporation, New York, N.Y.

[21] Appl. No.: 434,981

[22] Filed: Oct. 18, 1982

[30] Foreign Application Priority Data

Nov. 16, 1981 [NL] Netherlands ............. 8105160

[51] Int. Cl.³ .................................. H02M 3/335
[52] U.S. Cl. ........................................... 363/21
[58] Field of Search ............. 315/411; 358/190; 363/18, 19, 20, 21, 27, 28, 96, 97

[56] References Cited

U.S. PATENT DOCUMENTS 4,253,137 2/1981 Rao ...................... 363/28

FOREIGN PATENT DOCUMENTS 2034553 6/1980 United Kingdom .............. 363/21

Primary Examiner—William M. Shoop
Assistant Examiner—Jeffrey Sterrett
Attorney, Agent, or Firm—Thomas A. Briody; William J. Streeter

[57] ABSTRACT

A circuit for converting an input d.c. voltage into a stabilized output d.c. voltage. The circuit comprises a plurality of supply networks having diodes which are arranged in series and have the same conductivity direction, and the series network of an inductor and a storage capacitor in parallel with one of the diodes. The series diodes of a supply network are arranged in parallel with the storage capacitor of a supply network located closer to the input voltage source, the diode of the first supply network being connected to said source. A winding is connected by means of one side to the junction between the inductor and the capacitor of the supply network located remote from the source and by means of its other side to a further diode and to a controllable switch, the other side of the further diode being connected to the junction between the first and the second diode of the network located remote from the source. The circuit comprises also a tuning capacitor. The output voltage is kept constant by control of the period of time during which the switch is conducting.

2 Claims, 2 Drawing Figures

CIRCUIT FOR CONVERTING AN INPUT D.C. VOLTAGE INTO AN OUTPUT D.C. VOLTAGE

BACKGROUND OF THE INVENTION

The invention relates to a circuit for converting an input d.c. voltage into an output d.c. voltage which is substantially independent on variations of the input voltage and/or variations of a load connected to the output voltage and comprising a first diode which is connected to a first terminal of the input voltage and a second diode connected to the second terminal of the input voltage, the first and second diodes being arranged in series with the same conductivity direction, and a series network formed by an inductance and a capacitor being arranged in parallel with the first diode, the circuit further comprising a winding one side of which is coupled to the junction between the inductance and the capacitor and the other side to an electrode of an in operation periodically controlled controllable switch, the other electrode of the switch being connected to the second terminal of the input voltage while a further diode is coupled by means of one side to the junction between the first and second diodes and by means of its other side to the junction between the winding and the switch, this further diode having the same conductivity direction as the switch, the winding being part of a resonant network which also comprises a tuning capacitor, a rectifier being coupled to the capacitor for generating the output voltage, in operation a saw-tooth-shaped current flowing through the winding while energy is stored in the inductance for replenishing losses and the conductivity period of the switch depending on the output voltage or a voltage proportional thereto.

Such a circuit is disclosed in the publication "Philips, Electronic components and materials: Technical note 082", published in 1978. One or more stabilized supply voltages are obtained with this prior art circuit. It has been found that the voltage across the capacitor is proportional to the input voltage and to the ratio of the conductivity period of the controllable switch and the period of the drive signal thereof, so that this voltage and consequently the output voltage can be kept substantially constant by controlling the said ratio. Tuning by means of the tuning capacitor assures that the voltage across the switch does not become too high during the cut-off period and that ringing which might be caused by parasitic capacitances and might produce an unwanted radiation is prevented from occurring.

For the adequate operation of the circuit said ratio must remain between predetermined limit values, so that the voltage across the capacitor and consequently the output voltage may not have any arbitrary value. In addition, as the tuning frequency of the resonant network cannot be of any low value for a predetermined switching frequency, for example because the present supply voltage is combined in a television receiver with the line deflection circuit thereof the situation may occur where the voltage across the switch during the cut-off period thereof exceeds the maximum value prescribed for this element.

SUMMARY OF THE INVENTION

The invention has for its object to provide a circuit of the above-mentioned type in which, while maintaining the control possibilities of the prior art circuit, the output voltage may have an optionally low value and to that end the circuit in accordance with the invention is characterized in that it further comprises one or more supply networks each having a first and a second diode, an inductance and a capacitor, the first and second diodes of a supply network being arranged in series with the same conductivity direction in parallel with the capacitor of a supply network closer to the input voltage source and the inductance and the capacitor of the supply network under consideration forming a series network which is arranged in parallel with the first diode thereof, that end of the winding which is not connected to the controllable switch being connected to the junction between the inductance and the capacitor of the supply network remote from the input voltage source and that electrode of the further diode which is not connected to the switch being connected to the junction between the first and the second diodes of the supply network remote from the input voltage source.

A circuit for use in a picture display device, the drive signal of the controllable switch having the line frequency, may advantageously be characterized in that a line deflection coil is connected to a further winding which is coupled to the winding.

The invention will now be further described by way of example with reference to the accompanying Figures.

DESCRIPTION OF THE PREFERRED EMBODIMENTS

Figure 1:
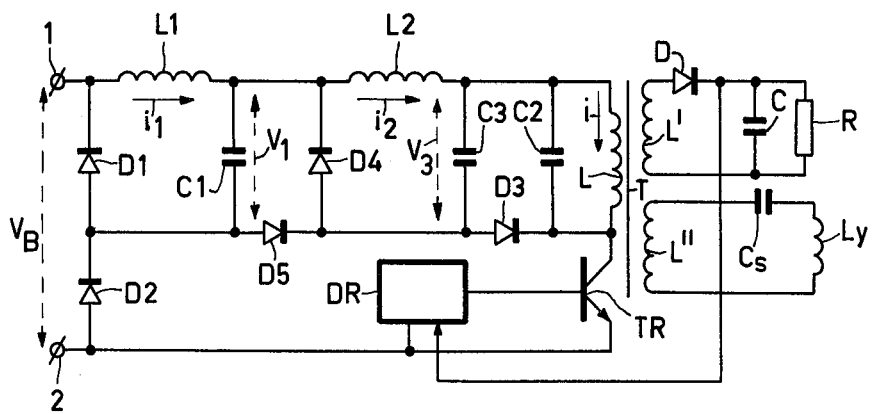
FIG. 1 shows an embodiment of the circuit, in accordance with the invention.

The circuit of FIG. 1 comprises the series arrangement of two diodes D1 and D2, which is connected between the terminals of a direct voltage source $V_B$, for example a mains rectifier. The cathode of diode D1 is connected to the positive terminal 1 of source $V_B$ and the anode of diode D2 is connected to the negative terminal 2, while the anode of diode D1 is connected to the cathode of diode D2 and to the anode of a diode D5 as well as to a capacitor C1. Also connected to terminal 1 is one end of an inductor L1 the other end of which is connected to the other terminal of capacitor C1, to the cathode of a diode D4 and to a second inductor L2. The cathode of diode D5 and the anode of a diode D4 are interconnected and connected to the anode of a further diode D3 as well as to a capacitor C3. The cathode of further diode D3 is connected to a tuning capacitor C2, to the primary winding L of a transformer T and to the collector of an npn-switching transistor TR. That end of inductor L2 which is not connected to inductor L1 is connected to the other terminal of capacitor C3, to the other terminal of capacitor C2 and to the other end of winding L. The emitter of transistor TR is connected to terminal 2 while a driver stage DR is included in the base lead for producing periodic switching pulses. One side of a secondary winding L' of transformer T is connected to a rectifier D and the other side to a smoothing capacitor C, the other electrode of rectifier D and the other terminal of capacitor C being interconnected. A load R is connected in parallel with capacitor C. If so desired, winding L' may be d.c. isolated from winding L.

Figure 2:
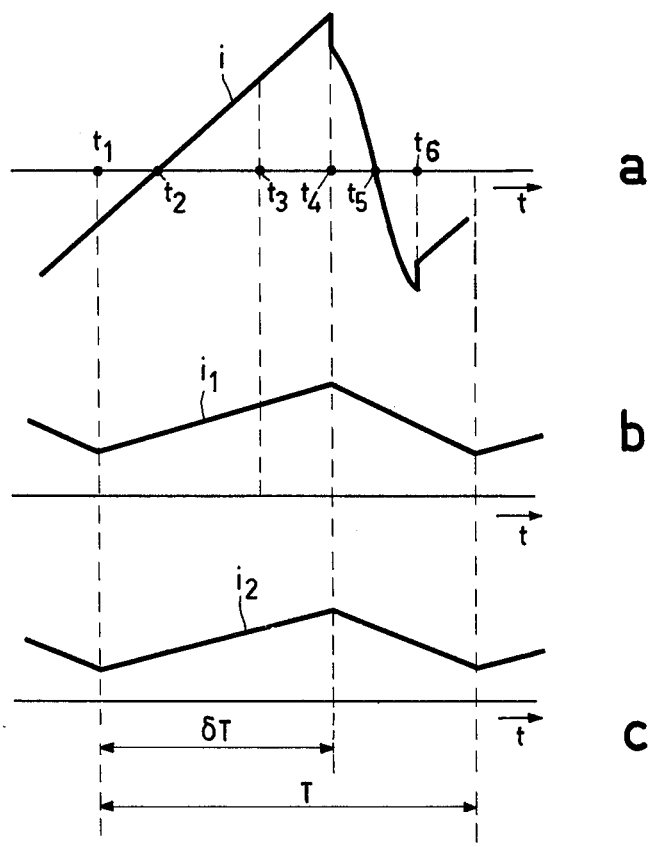
FIG. 2 shows waveforms occurring therein.

In operation, during a portion of the period of the switching signal from driver stage DR, diode D3 conducts while transistor TR is cut-off. A current i flows through winding L and capacitor C3. If the capacitance of this capacitor is large, then the voltage $V_3$ thereacross is substantially constant during the entire period, so that the variation of current i (see FIG. 2a) is substantially linear. The energy previously stored in inductor L1 produces a current $i_1$ flowing therethrough and which also flows through diode D1 and capacitor C1. With an adequately large capacitance of capacitor C1, the voltage $V_1$ thereacross is substantially constant and also the variation of current $i_1$ (see FIG. 2b) is substantially linear. In a similar manner the energy stored in inductor L2 produces a current $i_2$ which flows therethrough and through diode D4 and capacitor C3 and whose variation (see FIG. 2c) is substantially linear. Since the voltages $V_1$ and $V_3$ across capacitors C1 and C3, respectively, are substantially constant, these capacitors act as storage capacitors.

During the conducting period of diode D3 the voltage at the junction between inductors L1 and L2 is equal to $V_B+V_1$, so that the voltage across inductor L1 is equal to $-V_1$, and the voltage at the junction between inductor L2 and winding L is equal to $V_B+V_1+V_3$, so that the voltage across inductor L2 is equal to $-V_3$. As the voltages across inductors L1 and L2 are negative, the currents $i_1$ and $i_2$ therethrough decrease. From the foregoing it appears that diodes D2 and D5 are in the non-conducting state.

At an instant $t_1$ transistor TR is made conductive by a positive switching pulse applied to its base. Current i continues to flow in the same manner as prior to instant $t_1$. If current $i_1$ exceeds current $i_2$, then current $i_1$ flows through capacitor C1, diodes D5 and D3 and transistor TR, while current $i_2$ flows through capacitors C1 and C3 and through diode D5, which diode D5 is being kept in the conducting state by the larger current $i_1$. The voltage on the collector of transistor TR and the voltage at the junction between diodes D3, D4 and D5, which were both substantially equal to $V_B+V_1$, are now substantially zero, while the voltage at the junction between diodes D1, D2 and D5 which was substantially equal to $V_B$, is now substantially zero. The voltage on the junction between inductors L1 and L2 is substantially equal to $V_1$ so that the voltage across inductor L1 is equal to $V_B-V_1$ and the voltage at the junction between inductor L2 and winding L is substantially equal to $V_3$, so that the voltage across inductor L2 is equal to $V_1-V_3$. From this it appears that currents $i_1$ and $i_2$ increase in a substantially linear way. Current $i_1$ withdraws energy from source $V_B$ while current $i_2$ withdraws energy from voltage $V_1$, so also from source $V_B$. In this way losses are replenished. Diodes D1, D2 and D4 do not carry current.

If the circuit is dimensioned differently, so that current $i_2$ exceeds current $i_1$, then diode D5 cannot conduct. Current $i_2$ flows through diodes D2 and D3 and through transistor TR, while current $i_1$ returns through diode D2, which is maintained in the conducting state by current $i_2$, and via terminal 2 to source $V_B$. The values of the several voltages are the same as in the preceding case.

In practice, the values of inductors L1 and L2 will be chosen such that currents $i_1$ and $i_2$ cannot become zero. However, the inductance value of winding L is much smaller, so that current i becomes zero, more specifically at an instant $t_2$, and thereafter reverses its direction. It now flows through diode D3 in the cut-off direction thereof. At an instant $t_3$ currents i and $i_1$ have equal absolute values, as a result of which diode D3 stops conducting. Now current i finds its way through diode D2, which in the case current $i_2$ is lower than current $i_1$ was currentless, while the voltage thereacross was substantially zero and, which, in the opposite case, was conductive, and also flows through diode D5 and transistor TR. In both cases current $i_1$ flows through the conducting diode D2. After instant $t_3$ the voltages across inductors L1 and L2 and winding L do substantially not change.

In response to a negative pulse applied to its base transistor TR is cut-off at an instant $t_4$. Now current $i_1$ again flows through diode D1, while current $i_2$ flows through diode D4. The voltage at the junction between inductors L1 and L2 now again assume the value $V_B+V_1$, while the voltage at the junction between inductor L2 and winding L again assumes the value $V_B+V_1+V_3$. The voltages across inductors L1 and L2 again become negative, so that current $i_1$ and $i_2$ now decrease.

After instant $t_4$ current i flows through tuning capacitor C2 which prior to this instant was in parallel with capacitor C3, whose capacitance is much higher so that capacitor C2 did not exercise any influence. The capacitance of this capacitor C2 is chosen in such a manner that thereby and by inductances and other capacitances in the circuit a resonant network is formed whose resonant frequency is higher than the frequency of the drive signal of transistor TR. In these circumstances there is produced at the collector of transistor TR a substantially cosinusoidal voltage which is at the beginning higher than $V_B+V_1$, so that diode D3 remains in the non-conducting state. Also diodes D2 and D5 are non-conducting.

Due to the losses in the circuit and as current is applied to load R, current i has during the linear portion thereof a direct current component and instant $t_2$ is located before the central instant of this portion. After instant $t_4$ the current which flows through capacitor C2 cannot have any direct current component. At this instant the primary current of transformer T is subjected to a very rapid variation. This negative jump is equal to the said component. Thereafter current i decreases in a substantially sinusoidal way and becomes zero at the instant $t_5$ at which the voltage on the collector of transistor TR reaches a maximum, whereafter the current reverses its direction.

At an instant $t_6$ the voltage across diode D3 becomes again zero, as a result of which this diode is made conductive. Owing to the symmetry of the sine shape instant $t_5$ is located in the centre of the interval between $t_4$ and $t_6$. The oscillation stops at instant $t_6$ and the voltage from capacitor C3 is applied across winding L. Current i is subjected to the same jump as at instant $t_4$, however, in the positive direction, whereafter it increases in a substantially linear way. This is the same situation as prior to instant $t_1$.

The amplitude of the high voltage present across winding L between instants $t_4$ and $t_6$ depends on the ratio of the interval between these instants to the period, and, consequently, on the resonant frequency, while the voltage across winding L is substantially equal to the voltage $V_3$ during the remaining portion of the cycle. A proper choice of the resonant frequency will ensure that the voltage on the collector of transistor TR between instants $t_4$ and $t_6$ cannot become higher than the value which is the maximum permissible value for this transistor.

The voltage at winding L' has substantially the same shape as the voltage at winding L. The winding sense of winding L' as well as the conductivity direction of rectifier D can be chosen in such a way that the rectifier is conducting to apply a current to capacitor C, either during a part of the interval between $t_4$ and $t_6$ or during a part of the remainder of the cycle. The voltage across this capacitor is fed-back to driver stage DR for influencing in known manner the conductivity period of transistor TR thus that the said voltage remains substantially constant. In these circumstances other d.c. voltages generated by means of other secondary windings, not shown, of transformer T and which are proportional to the voltage across capacitor C are also substantially constant.

If the time interval between instants $t_1$ and $t_4$ in which transistor TR is conducting is denoted $\delta T$, T being the period of the switching signal, then the equations by means of which it is expressed that the average voltages across inductors L1 and L2 are zero, can be written as follows:

$$\delta(V_B - V_1)T = (1 - \delta)V_1 T$$

and $$\delta(V_1 - V_3)T = (1 - \delta)V_3 T.$$

From this it appears that $$V_1 = \delta V_B \text{ and } V_3 = \delta V_1 = \delta^2 V_B.$$

The circuit of FIG. 1 can be extended by interrupting the connection between the junction between elements L2 and C3 and the upper junction in the Figure between elements L and C2, as well as the connection between the anode of further diode D3 and capacitor C3, and by connecting an additional supply network formed by an inductor, a capacitor and two diodes and being of the same structure as networks L1, C1, D1, D2 and L2, C3, D4, D5 at one side to capacitor C3 and at the other side between the said anode and the upper junction between elements L and C2. In a similar manner as the first network L1, C1, D1, D2 is connected to voltage $V_B$ and the second network L2, C3, D4, D5 to voltage $V_1$ this third network is connected to voltage $V_3$. It will be clear that the circuit (not shown) obtained in this manner operates in a similar manner as the circuit of FIG. 1 and that the voltage applied during the time interval prior to instant $t_4$ across winding L is equal to $\delta^3 V_B$. If the circuit comprises n networks of the same type as the said networks, then the said voltage will be equal to $\delta^n V_B$. Herein no account has been taken of the fact that one or more elements of the circuit may be connected to taps of the several inductors, which furnishes further degrees of freedom for the circuit design.

The circuit may be used to generate one or more stabilized supply voltages for loads connected to these voltages. The circuit may, for example, be used in a picture display device, for example a television receiver. If the line frequency is chosen for the repetition rate of the control signal applied to transistor TR then the circuit of FIG. 1 or a variant thereof, just described, may be combined with the line deflection circuit. A secondary winding of transformer T can then produce a drive signal for controlling a line output switch by means of which a line deflection current is generated which flows through a line deflection coil, i.e. the coil for deflecting in the horizontal direction of one or more electron beams generated in a picture display tube. In a suitable design, the line deflection coil can be connected to a secondary winding of the transformer T so that the use of a line output switch and associated circuit elements is not necessary, as the voltage across such a winding is substantially constant during the linear portion of current i. This is shown in FIG. 1 for the event that two supply networks are used. Herein the line deflection coil $L_Y$ is arranged in series with a capacitor $C_s$ for the S-correction and the series network formed is connected to a secondary winding L" of transformer T.

With a combined supply- and line deflection circuit ratio $\delta$ must satisfy certain requirements. In that event transistor TR must be conducting at least between the central instant of the line scan period and instant $t_4$. If transistor TR is not conducting after the central instant then the voltage at the collector thereof increases, so that, if the transistor is turned-on at a later instant a large dissipation is produced which may even cause damage to the transistor. Also in the event of a non-combined circuit, transistor TR must timely be made conductive. For a line period of approximately 64 $\mu s$ and a line flyback period of approximately 12 $\mu s$ this means in a circuit without losses that ratio $\delta$ may vary between the values $52/64 = 0.8$ and $26/64 = 0.4$, so that voltage $V_1$ has its value between $0.4\ V_B$ and $0.8\ V_B$, while voltage $V_3$ has its value between $0.16\ V_B$ and $0.64\ V_B$. From this it appears that it is possible, with the circuit shown in FIG. 1, to derive a line deflection circuit directly from an unstabilized direct voltage, even if the required trace voltage for the line deflection coil is less than $0.4\ V_B$, which is not possible with the single circuit, that is to say if the second supply network L2, C3, D4, D5 is absent. It will be noted that also the condition that the time between instants $t_4$ and $t_6$ is substantially equal to the predescribed line flyback period, which determines the value of the resonant frequency with tuning capacitor C2, must be satisfied.

It will be obvious that FIG. 1 shows a simplified circuit diagram for which a number of known variants may be used, for example by arranging capacitor C2 in parallel with diode D3 or in parallel with winding L', and wherein known elements may be added. Such an element is, for example, a linearity correction device for line deflection coil $L_Y$. Transistor TR may be replaced by every known type of electronic switch, for example by a gate turn-off switch. It will also be obvious that also inductors L1 and/or L2 may be in the form of primary windings of transformers, whose secondary windings can be used for loads and/or a line deflection circuit, while winding L need not be a primary winding of a transformer. Herein the control of ratio $\delta$ may be effected in dependence on a primary or a secondary winding of one of these transformers.

It will be noted also that voltage source $V_B$ may be connected between the junction of inductance L1 and capacitor C1, or a similar junction, and terminal 2, as a result of which inductor L1 has no longer a function. The output voltage is then attenuated to a lesser extent relative to voltage $V_B$ than in the case of FIG. 1, which can be advantageously used for the event that two different supply voltage sources are available. Either the one or the other source is then connected by means of a selector switch, while the output voltage remains unchanged, thanks to an adequate design.

What is claimed is:

1. A circuit for converting an input d.c. voltage into an output d.c. voltage which is substantially independent of variations of the input voltage and/or variations of a load connected to the output voltage and comprising a first supply network having a first diode connected to a first terminal for the input voltage and a second diode connected to a second terminal for the input voltage; the first and second diodes being arranged in series with the same conductivity direction, said first supply network also having a series network formed by an inductor and a storage capacitor arranged in parallel with the first diode; the circuit further comprising a winding one end of which is coupled to the junction between the inductor and the storage capacitor and the other end to an electrode of a controllable switch, the other electrode of the switch being connected to the second terminal for the input voltage while a further diode is coupled by one electrode to the junction between the first and second diodes and by means of its other electrode to the junction between the winding and the switch; this further diode having the same conductivity direction as the switch and the winding being part of a resonant network which also comprises a tuning capacitor; a rectifier and load being coupled to the storage capacitor for producing the output voltage, and wherein in operation a saw-tooth-shaped current flowing through the winding while energy is stored in the inductor for replenishing losses and the conductive periods of the switch depend on the output voltage or a voltage proportional thereto; characterized in that the circuit further comprises one or more additional supply networks each having a first and a second diode, an inductor and a storage capacitor, which first and second diodes are arranged in series with the same conductivity direction in parallel with the storage capacitor of the preceding supply network and the inductor and the capacitor of each additional supply network forming a series network which is arranged in parallel with its first diode; the end of the winding which is not connected to the controllable switch being coupled to the junction between the inductor and the capacitor of the additional supply network remote from the input voltage terminals, while the electrode of the further diode which is not connected to the switch is connected to the junction between the first and the second diodes of the additional supply network remote from the input voltage terminals.

2. A circuit as claimed in claim 1 for use in a picture display device, the drive signal of the controllable switch having the line frequency, characterized in that a line deflection coil is connected to a further winding which is coupled to the winding.

* * * * *